(12) United States Patent
Yong et al.

(10) Patent No.: US 7,737,891 B2
(45) Date of Patent: Jun. 15, 2010

(54) ARRAY ANTENNA SYSTEM

(75) Inventors: Su-Khiong Yong, Yongin-si (KR); Young-hwan Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 11/776,193

(22) Filed: Jul. 11, 2007

(65) Prior Publication Data

US 2008/0158054 A1 Jul. 3, 2008

(30) Foreign Application Priority Data

Dec. 28, 2006 (KR) .................. 10-2006-0136582

(51) Int. Cl.
*H01Q 3/02* (2006.01)
(52) U.S. Cl. ..................... 342/374; 342/372
(58) Field of Classification Search ............. 342/368, 342/372–374; 455/277.1, 277.2
See application file for complete search history.

(56) References Cited

U.S. PATENT DOCUMENTS 4,806,938 A * 2/1989 Meadows .............. 342/370

2002/0033766 A1 * 3/2002 Pratt ................. 342/357.06
2003/0125091 A1 7/2003 Choi et al.

FOREIGN PATENT DOCUMENTS

EP 0 831 551 A2 3/1998
WO 03/034614 A1 4/2003

OTHER PUBLICATIONS

Lal C. Godara, "Application of Antenna Arrays to Mobile Communications, Part II: Beam-Forming and Direction-of-Arrival Considerations", Proceedings of the IEEE, Aug. 8, 1997, pp. 1195-1245, vol. 85, No. 8.

* cited by examiner

*Primary Examiner*—Dao L Phan
(74) *Attorney, Agent, or Firm*—Sughrue Mion, PLLC (57) ABSTRACT

An array antenna system is provided. The array antenna system includes a plurality of antenna elements which are arranged at intervals in rows and in columns; and a control means which selectively operates at least two antenna elements of the plurality of the antenna elements according to a direction of received radio signals.

14 Claims, 6 Drawing Sheets

ARRAY ANTENNA SYSTEM

CROSS-REFERENCE TO RELATED APPLICATIONS

This application claims priority from Korean Patent Application No. 10-2006-0136582, filed on Dec. 28, 2006 in the Korean Intellectual Property Office, the disclosure of which is incorporated herein by reference in its entirety.

BACKGROUND OF THE INVENTION

1. Field of the Invention

Systems consistent with the present invention relate to an array antenna and, more particularly, to an array antenna system for rapidly producing a beam patterns in accordance with a communication direction of radio signals.

2. Description of the Related Art

Recently, in the radio communications, a communication scheme is being developed to transmit and receive radio signals over a short range. It is known in the art to employ an array antenna for such communications. Such a communication scheme is often used in millimeter wave communication. However, array antennas, along with their associated techniques, are used in other types of communication as well.

Typically, related art array antennas include a plurality of antenna elements. Beams radiated from the antenna elements are overlapped to obtain directivity, and it is desirable to have high main lobe gain, and a sufficiently low sidelobe level in order to avoid interference with other devices.

Since array antennas have directivity, a vertical angle of the main lobe (i.e., a tilt angle) is changed so as to transmit and receive radio signals in a specific direction. The vertical angle of the main lobe can be changed by tweaking a phase between signals fed to the antenna elements. By this means, the gain of the main lobe can be raised.

A related art method of tweaking the phase between signals is to adjust the phase of the signals received at the antenna elements using variable phase shifters. The antenna elements are thus provided with separate variable phase shifters respectively. The phase of the radio signal from the antenna element is tweaked by the variable phase shifter, to thus change the vertical angle of the main lobe. Whether the tilt angle is optimal is determined after the phase of every tiltable angle is adjusted.

In the related art method using the variable phase shifter, the tilt angle has to be changed by continually shifting the phase at the variable phase shifter until the optimum main lobe gain and the optimum sidelobe level are acquired. This method has a disadvantage in that it takes a long time to acquire an optimum tilt angle. Additionally, because each antenna element needs to include a separate variable phase shifter, the cost and the size of the antenna system are high, which is problematic. To address some of these shortcomings, a method using a single variable phase shifter has been suggested. However, the single variable phase shifter raises the sidelobe level, creating a disadvantage in that interference with other devices is increased.

SUMMARY OF THE INVENTION

Exemplary embodiments of the present invention address the above disadvantages and other disadvantages not described above. Also, the present invention is not required to overcome the disadvantages described above, and an exemplary embodiment of the present invention may not overcome any of the problems described above.

The present invention provides an array antenna system for reducing a time taken to find an optimum tilt angle, providing a high main lobe gain and a low sidelobe level, and achieving a reduction in cost and a decrease in power consumption by virtue of a simplified structure.

According to an aspect of the present invention, there is provided an array antenna system including a plurality of antenna elements which are arranged at intervals in rows and in columns; and a control means which selectively operates some of the plurality of the antenna elements according to a direction of transmitted and received radio signals.

The plurality of the antenna elements may be arranged in an n×n matrix form at regular intervals.

The array antenna system may further include a plurality of radio frequency (RF) circuits which process signals from the antenna elements which selectively operate among the plurality of the antenna elements.

The control means may include a direction determiner which determines a direction of the radio signals transmitted and received on the plurality of the antenna elements according to a result from the RF circuits.

The direction determiner may determine the direction of the radio signals depending on a strength difference of the radio signals transmitted and the received on the antenna elements.

The control means may include n-ary switches which selectively couple the antenna elements to the RF circuits.

The control means may include a switch controller which selects antenna elements from the plurality of the antenna elements depending on the direction of the radio signals, and operates the switches so as to form beam patterns in close proximity to the direction of the radio signals.

The switch controller may select the antenna elements such that the selected antenna elements form a line.

The switch controller may select the antenna elements such that the selected antenna elements form a line which is as perpendicular as possible to the direction of the radio signals.

The switch controller may select n-ary antenna elements from the plurality of the antenna elements arranged in the n×n matrix form.

The switch controller may selectively couple n-ary antenna elements arranged in a rectangular form among the plurality of the antenna elements, to the switches.

The n-ary antenna elements arranged in the rectangular form may be disposed as far apart as possible from one another.

The beam patterns may be closer to the direction of the radio signals as a number of the selected antenna elements increases.

BRIEF DESCRIPTION OF THE DRAWING FIGURES

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Certain exemplary embodiments of the present invention will now be described in greater detail with reference to the accompanying drawings.

In the following description, same drawing reference numerals are used for the same elements even in different drawings. The matters defined in the description, such as the detailed construction and elements, are provided to assist in a comprehensive understanding of the invention. Thus, it is apparent that the present inventive concept can be carried out without those specifically defined matters. Also, well-known functions or constructions are not described in detail since they would obscure the invention with unnecessary detail.

Figure 1:
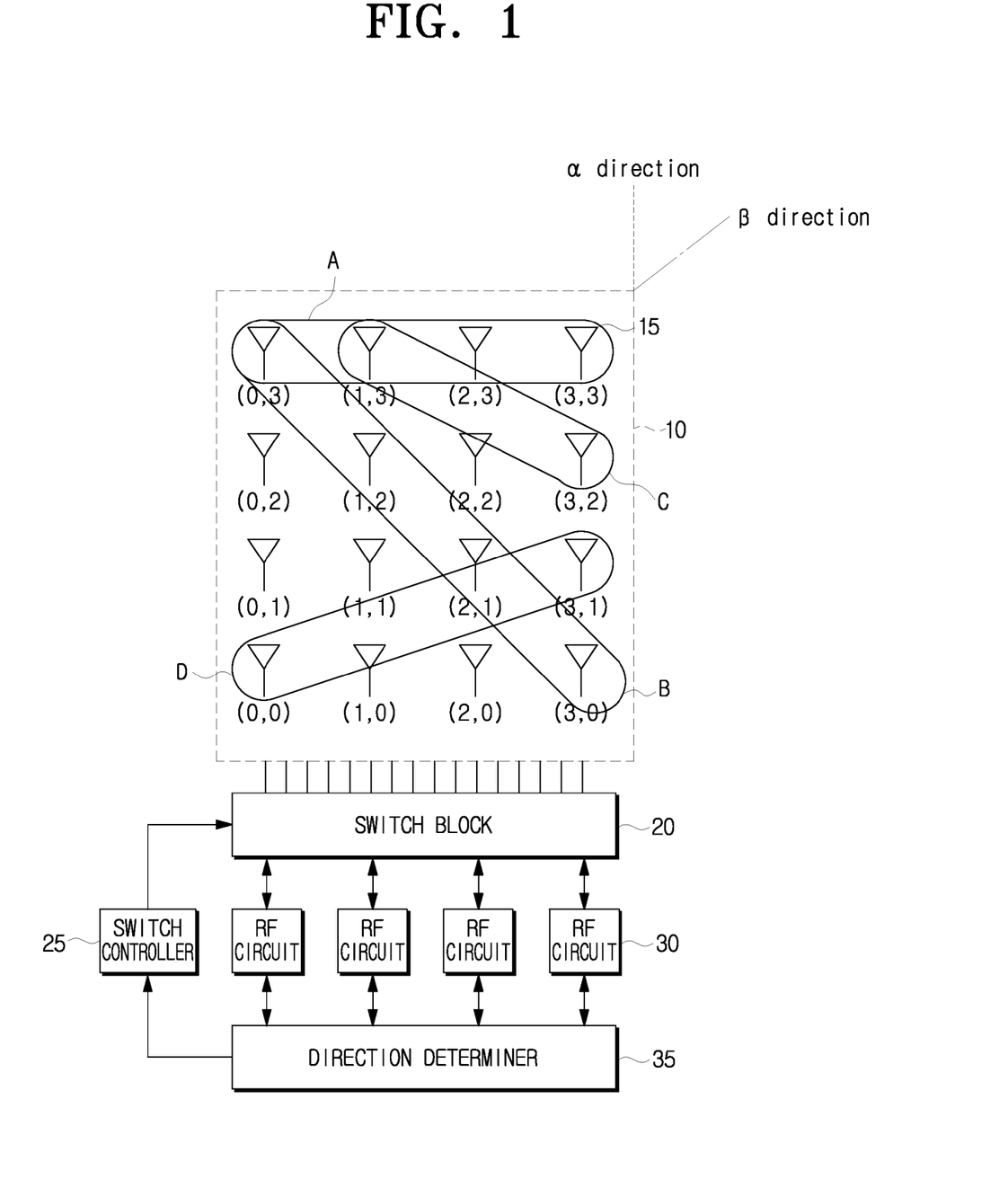
FIG. 1 is a diagram of an array antenna system according to an exemplary embodiment of the present invention.

FIG. 1 is a diagram of an array antenna system according to an exemplary embodiment of the present invention.

The array antenna system includes an antenna array 10 including a plurality of antenna elements 15, a switch block 20, a switch controller 25, at least one RF circuit 30, and a direction determiner 35.

The antenna array 10 includes a plurality of antenna elements 15 arranged in rows and columns at intervals. That is, the antenna elements 15 are arranged in n×n matrix form. Herein, it is advantageous if the interval between the antenna elements 15 is regular in rows and in columns and determined according to the operating frequency band of the antenna. FIG. 1 shows the 4×4 matrix antenna array 10 by way of example.

Each antenna element 15 of the antenna array 10 is selectively turned on or off according to the direction of transmitted and received radio signals. In doing so, at least two antenna elements 15 are turned on. For instance, in coordinates of the antenna elements 15 in FIG. 1, the antenna elements 15 at the coordinates (0, 3), (1, 2), (2, 1) and (3, 0) (i.e., line "B") may be turned on, or the antenna elements 15 at the coordinates (0, 3), (1, 3), (2, 3) and (3, 3) (i.e., line "A") may be turned on. Also, two antenna elements 15 at the coordinates (1, 3) and (3, 2) (i.e., line "C") may be turned on or two antenna elements 15 at the coordinates (3, 1) and (0, 0) (i.e., line "D") may be turned on. The antenna elements 15 arranged in the rectangular form at the coordinates (0, 3), (0, 0), (3, 0) and (3, 3) may be turned on. The combination of the antenna elements 15 being turned on in the antenna array 10 can vary depending on the direction of transmitted and received radio signals and the selection method.

The switch block 20 includes a plurality of switches (not shown) to turn on or off the antenna elements 15. The number of the switches depends on a maximum number of the antenna elements 15 to be turned on. For instance, when the antenna array 10 is arranged in n×n form and the maximum number of antenna elements 15 to be turned on is n, the switch block 20 includes n-ary switches. For example, in FIG. 1, as the antenna array 10 has 4×4 arrangement, the switch block 20 may include four switches. Each switch would then have n×n contact points at maximum so as to turn on and off all of the antenna elements 15. In FIG. 1, each switch would thus include 16 contact points at maximum. Alternative arrangements for the switches in FIG. 1 would be to have 16 switches, with each switch having one contact point, or 2 switches with 8 contact points each, etc. Accordingly, there are various possible combinations to turn on the antenna elements 15.

The switch controller 25 provides information relating to the antenna elements 15 to be turned on by the switch block 20. For instance, to turn on the antenna elements 15 at the coordinates (0, 3), (0, 2), (0, 1) and (0, 0), the switch controller 25 provides each switch with a control signal to turn on (0, 3), a control signal to turn on (0, 2), a control signal to turn on (0, 1), and a control signal to turn on (0, 0).

The RF circuit 30 processes the radio signals transmitted and received on the antenna elements 15. A single RF circuit or a plurality of RF circuits can be provided. For example, four RF circuits 30 are provided in FIG. 1, and the number of RF circuits 30 is selected according to the number of switches. The RF circuits 30 process and output the radio signals to the outside, and provide the processed signals to the direction determiner 35 at the same time.

The direction determiner 35 determines a direction of the radio signals received on the antenna elements 15 according to the result processed at the RF circuits 30. In an initial operation of the antenna system, to determine the direction of the radio signals, a plurality of antenna elements 15 among the antenna elements 15 of the antenna array 10 are turned on. The antenna elements 15 initially turned on have an arrangement which enables the direction determination of the radio signals to be easily performed. For instance, in the initial operation of the antenna system, antenna elements 15 at the coordinates (0, 3), (1, 3), (2, 3) and (3, 3) may be turned on.

By measuring the strength of the radio signals received on the antenna elements 15, the direction determiner 35 determines the direction of the radio signals depending on a value of the strengths of the radio signals received on the antenna elements 15.

The direction determiner 35 determines the direction of the radio signals and provides the direction information to the switch controller 25, and the switch controller 25 controls the switches to turn on the antenna elements 15 arranged along a line perpendicular to the direction of the radio signals.

For instance, when the direction of the radio signals is α, that is, when incident angle is θ=90 degrees with respect to the antenna elements 15 along the line A in FIG. 1, the switch controller 25 issues control signals to turn on the antenna elements 15 at the coordinates (0, 3), (1, 3), (2, 3), and (3, 3) arranged perpendicular to the radio signals. At this time, note that the antenna elements 15 in any line parallel to the line A may be turned on. In other words, the antenna elements at coordinates (0, 2), (1, 2), (2, 2), and (3, 2) may be alternatively turned on. If the direction of the radio signals is β, that is, when the incident angle is θ=45 degrees with respect to the line A, the switch controller 25 issues control signals to turn on the antenna elements 15 at the coordinates (0, 3), (1, 2), (2, 1), and (3, 0) forming the line B. At this time, note that the antenna elements 15 in any line parallel to the line A may be turned on.

Figure 2:
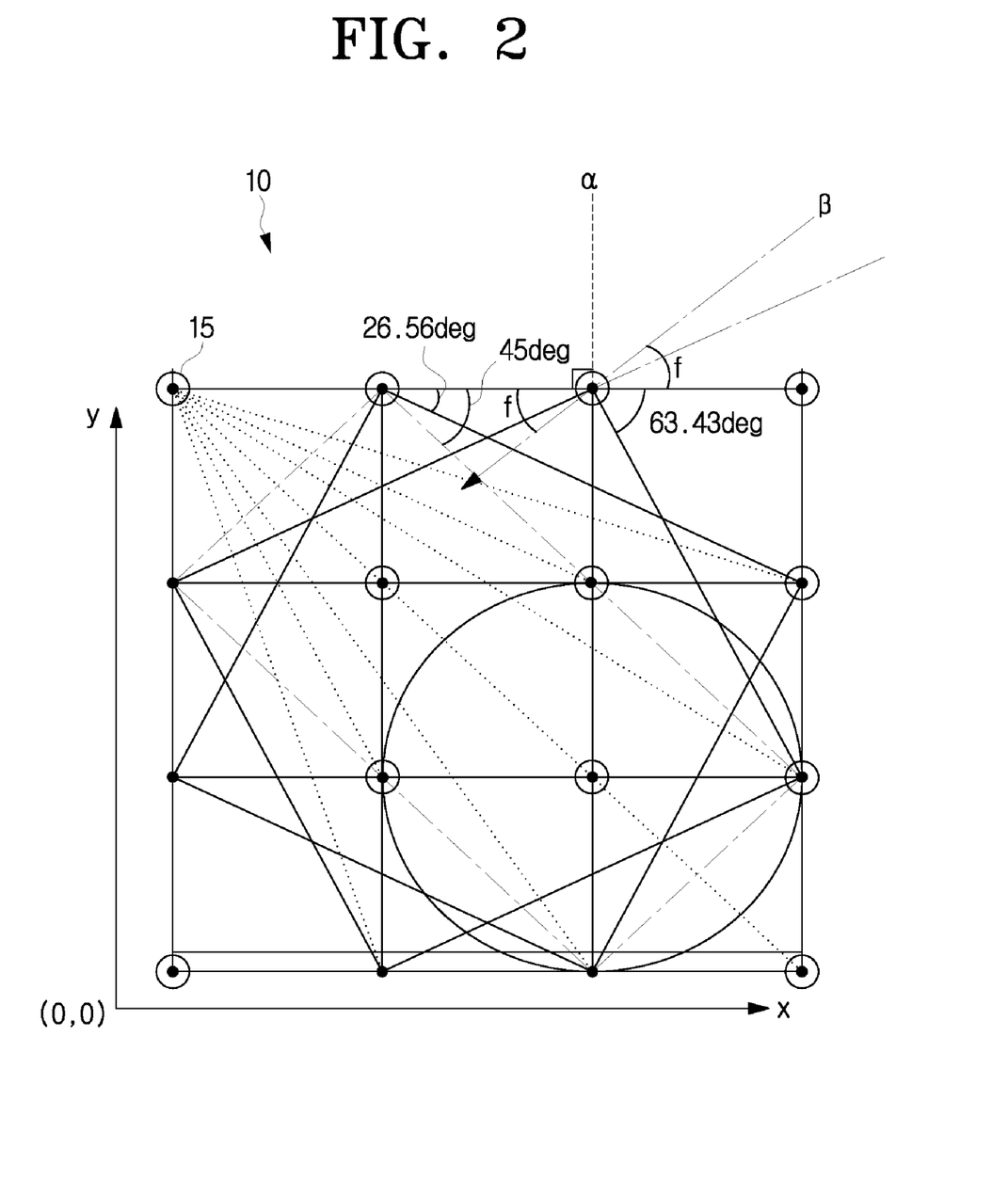
FIG. 2 is another diagram of the antenna array of FIG. 1.

FIG. 2 is a another diagram of the antenna array of FIG. 1.

The antenna array 10 includes sixteen antenna elements 15 in total which are arranged in a grid having an x-axis and y-axis. The spacing between the antenna elements 15 is λ/2 along the x-axis and the y-axis respectively, where λ denotes a wavelength of the operating frequencies transmitted and received on the antenna elements 15. Various lines interconnecting the antenna elements 15 indicate various combinations of the antenna elements 15 which are turned on according to the direction of the radio signals.

Dotted lines from the antenna element at coordinates (0, 3) indicate combinations of the antenna elements 15 that can be turned on together with the antenna element 15 at (0, 3). Like the antenna element (0, 3), other antenna elements 15 can form combinations to be turned on. For example, the rectangle connecting the antenna elements (1, 3), (0, 1), (2, 0), and (3, 2), the antenna elements in a rectangle (1, 3), (0, 2), (2, 0), and (3, 1), and the antenna elements in a rectangle (2, 3), (0, 2), (1, 0), and (3, 1) represent the transmission and the reception of the radio signals by turning on the antenna elements 15 arranged along the respective rectangles.

Figure 3A:
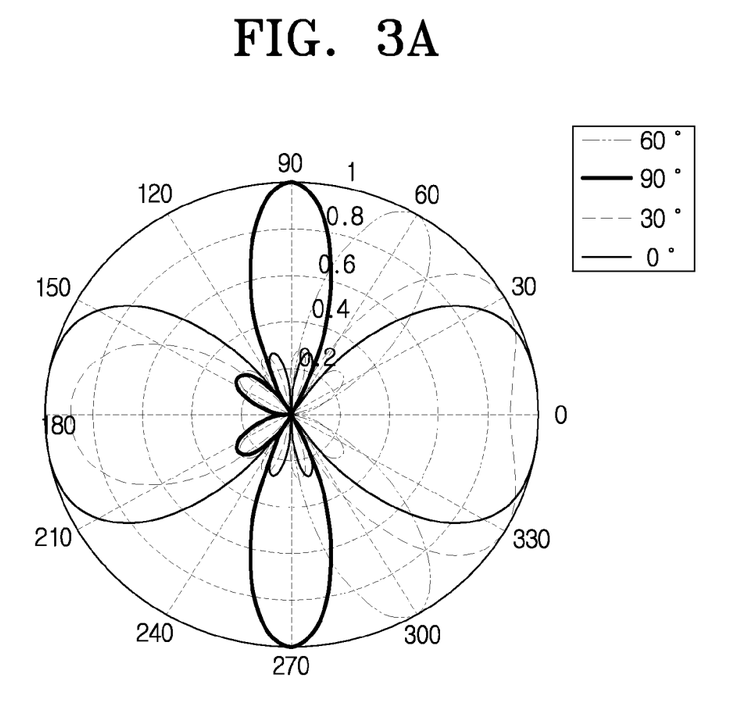
FIG. 3A is a graph of beam patterns when antenna elements of the antenna array of FIG. 2 are turned on in a line form.
Figure 3B:
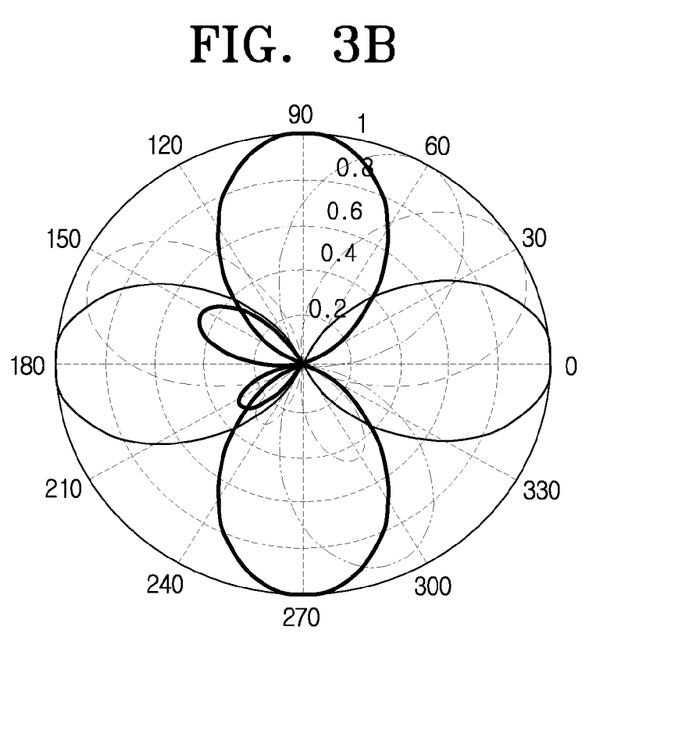
FIG. 3B is a graph of beam patterns when antenna elements of the antenna array of FIG. 2 are turned on in a rectangular form.

FIG. 3A is a graph showing beam patterns when the antenna elements of the antenna array of FIG. 2 are turned on in a line form, and FIG. 3B is a graph showing beam patterns when the antenna elements of the antenna array of FIG. 2 are turned on in a rectangular form.

FIG. 3A shows the beam patterns when incident angles are 0, 30, 60 and 90 degrees with respect to a plurality of the antenna elements 15 turned on in the line form. For example, FIG. 3A shows the beam patterns when the incident angles are 0, 30, 60 and 90 degrees with respect to the antenna elements 15 at the coordinates (0, 3), (1, 3), (2, 3), and (3, 3) in FIG. 1. As shown in FIG. 3A, when the incident angle is 90 degrees for the antenna elements 15, the most sharp beam pattern is produced. That is, since the beam intensity is concentrated at the incident angle of 90 degrees, the directivity and the gain of the main lobe are high. By contrast, since the beam becomes thick as the incident angle advances to 60, 30, and 0 degrees, the beam intensity becomes weak and the directivity and the gain of the main lobe are low.

In more detail, in FIG. 3A, when turning on the antenna elements 15 arranged in the line form, the antenna elements 15 belonging to the line at a right angle to the incident angle should be turned on. For example, when the incident angle of the radio signals is 90 degrees with respect to the line A, the antenna elements 15 at the coordinates (0, 3), (1, 3), (2, 3), and (3, 3) are turned on. When the incident angle of the radio signals is 90 degrees with respect to the line B, the antenna elements 15 at the coordinates (0, 3), (1, 2), (2, 1), and (3, 0) forming the line B are turned on.

FIG. 3B shows the beam patterns when the incident angle is 0, 30, 60, and 90 degrees with respect to the antenna elements 15 being turned on in the rectangular shape, where the spacing between the antenna elements 15 is λ/2 and the incident angle is based on the line A. If the antenna elements 15 are arranged in the rectangular shape and their spacing is λ/2, there are nine different possible arrangements. Two examples of the nine different possible arrangements are the antenna elements at the coordinates (0, 3), (1, 3), (0, 2), and (1, 2) or at the coordinates (1, 2), (2, 2), (1, 1), and (2, 1).

As above, when the antenna elements 15 are turned on in the rectangular form, the beam pattern at the incident angle of 90 degrees in FIG. 3B is wider than the bean pattern generated at the incident angle of 90 degrees in FIG. 3A. When the antenna elements 15 are turned on in the rectangular form, almost the same beam patterns are generated at 0, 30, 60, and 90 degrees, which implies a lower gain of the main lobe with the directivity. In other words, when the antenna elements 15 are turned in the rectangular form, lower directivity and lower gain of the main lobe are produced, compared to the case where the antenna elements 15 are turned on in the line form. Thus, it is advantageous to turn on the antenna elements 15 in the line form rather than the rectangular form.

Figure 4:
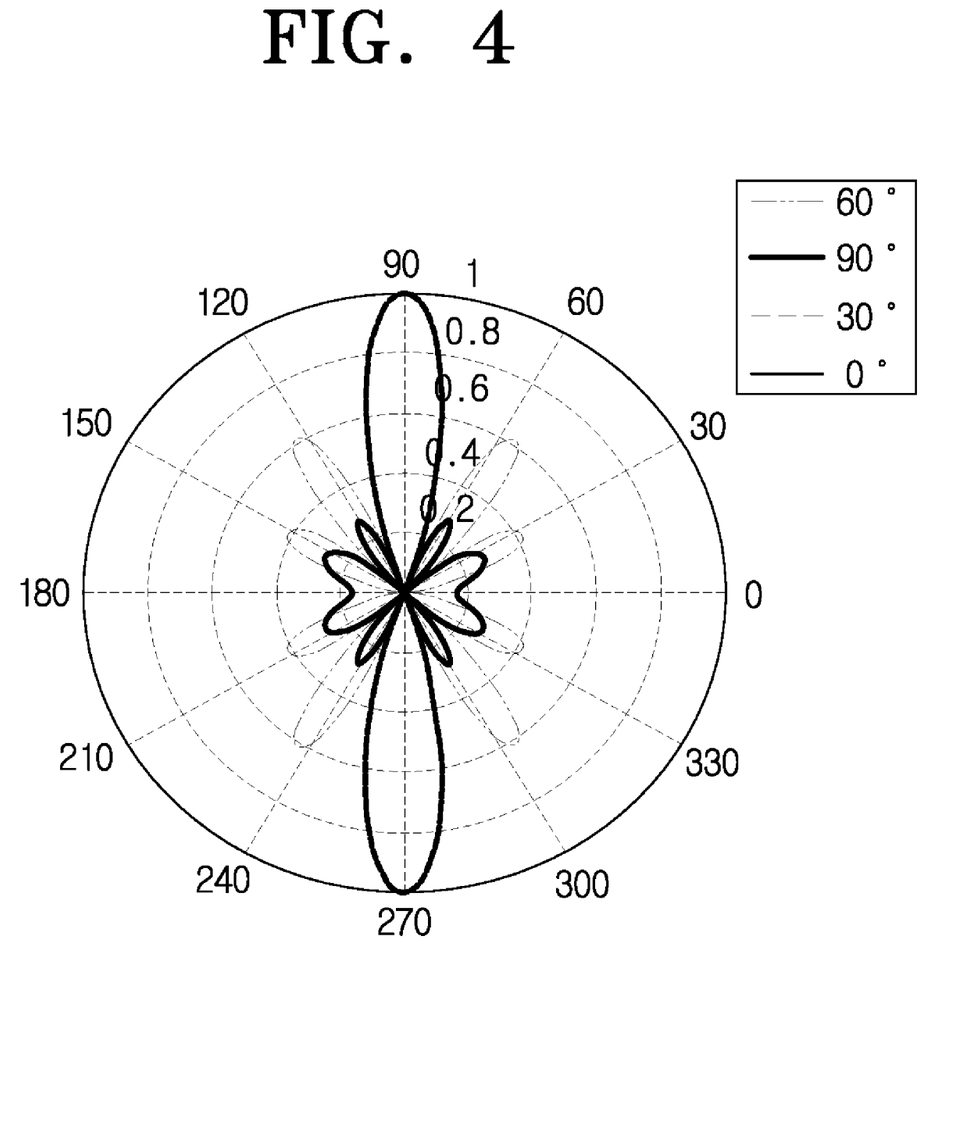
FIG. 4 is a graph comparing the beam patterns when the antenna elements of FIG. 1 are turned on in the line form and in the rectangular form.

FIG. 4 is a graph comparing the beam patterns when the antenna elements of FIG. 1 are turned on in another arrangement of the antenna elements of FIG. 1 in the line form and in the rectangular form. In this case where the antenna elements 15 are turned on in the line form, the antenna elements 15 at the coordinates (0, 3), (1, 2), (2, 1), and (3, 0) (i.e., line "B") are turned on with the spacing 0.7λ between the antenna elements 15, and where the antenna elements 15 are turned on in the rectangular form, the antenna elements 15 at the coordinates (0, 3), (3, 3), (0, 0), and (3, 0) are turned on with the spacing 1.5λ between the antenna elements 15.

As shown in FIG. 4, the magnitude of the main lobe is substantially the same when the antenna elements 15 are turned in the line form and in the rectangular form. However, the greater sidelobes are produced when the antenna elements 15 are turned on in the rectangular form. The sidelobes degrade the antenna efficiency by causing interference with other devices when transmitting and receiving the radio signals.

Therefore, it is advantageous to turn on the antenna elements 15 in the line form as shown in FIG. 4 in order to lower the sidelobe level.

Figure 5:
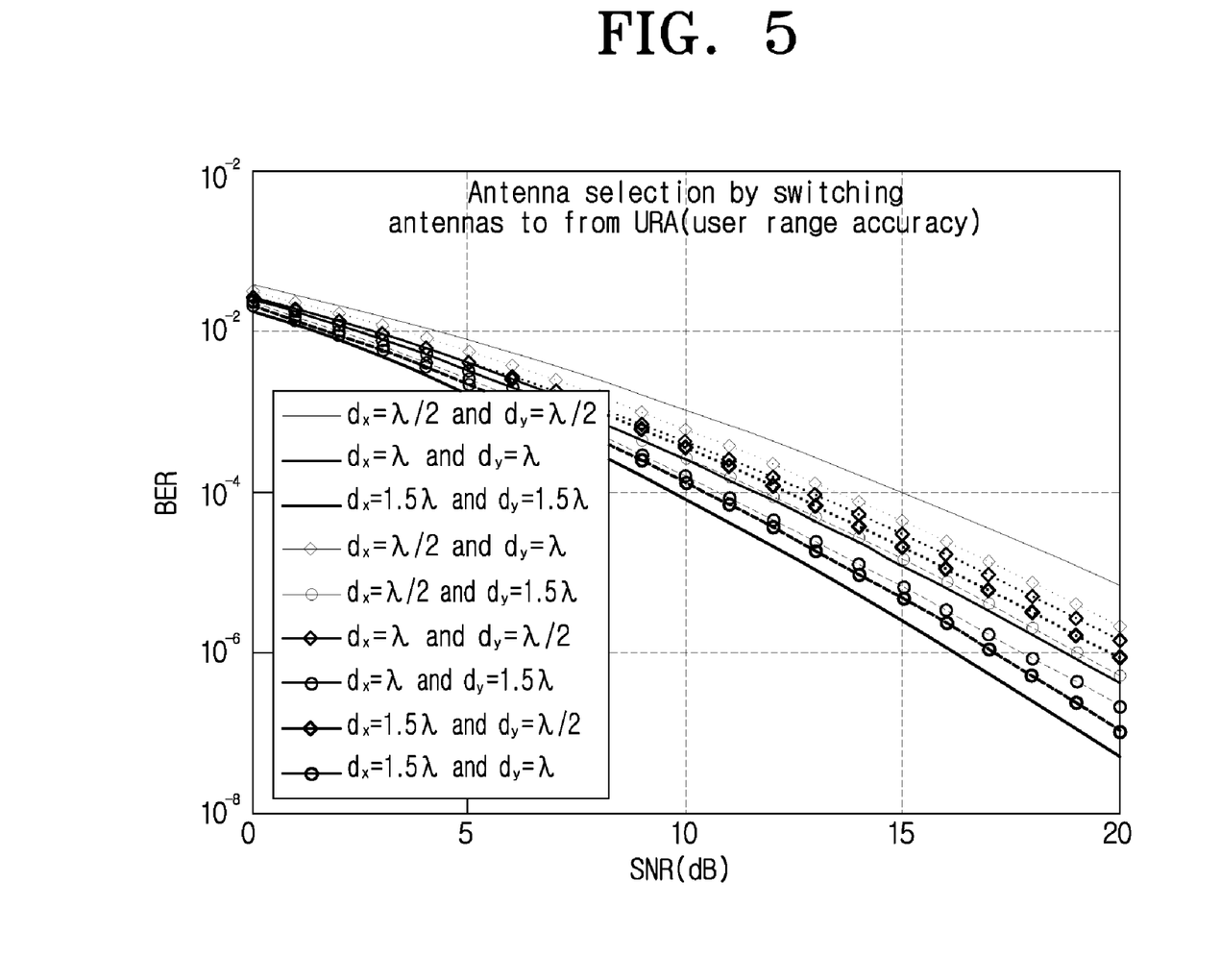
FIG. 5 is a graph of a bit error rate (BER) when the antenna elements of the antenna array of FIG. 1 are turned on in the rectangular form.

FIG. 5 is a graph showing a bit error rate (BER) when the antenna elements 15 of the antenna array of FIG. 1 are turned on in the rectangular form. In FIG. 5, $d_x$ denotes the distance between the antenna elements 15 on the x-axis and $d_y$ denotes the distance between the antenna elements 15 on the y-axis. Particularly, FIG. 5 shows the BER of the antenna elements 15 turned on in nine rectangular forms.

When $d_x=\lambda/2$ and $d_y=\lambda/2$, neighboring four antenna elements 15 are turned on, for example the antenna elements 15 at the coordinates (0, 3), (1, 3), (0, 2), and (1, 2).

When $d_x=\lambda$ and $d_y=\lambda$, the antenna elements 15 at an interval of λ are turned on, for example the antenna elements 15 at the coordinates (1, 3), (3, 3), (1, 1), and (3, 1).

When $d_x=1.5\lambda$ and $d_y=1.5\lambda$, the antenna elements 15 at the coordinates (0, 3), (3, 3), (0, 0), and (3, 0) are turned on.

When $d_x=\lambda/2$ and $d_y=\lambda$, the combination is of the neighboring antenna elements 15 on the x-axis and every other antenna elements 15 on the y-axis, for example, the antenna elements at the coordinates (1, 3), (2, 3), (1, 1), and (2, 1) are turned on.

When $d_x=\lambda/2$ and $d_y=1.5\lambda$, the combination is of the antenna elements 15 neighboring on the x-axis and every two other antenna elements 15 on the y-axis, for example, the antenna elements 15 at the coordinates (2, 3), (3, 3), (2, 0), and (3, 0) are turned on.

When $d_x=\lambda$ and $d_y=\lambda/2$, the combination is of every other antenna elements 15 on the x-axis and the antenna elements 15 neighboring on the y-axis, for example, the antenna elements 15 at the coordinates (0, 1), (2, 1), (0, 0), and (2, 0) are turned on.

When $d_x=\lambda$ and $d_y=1.5\lambda$, the combination is of every other antenna elements 15 on the x-axis and every two other antenna elements 15 on the y-axis, for example, the antenna elements 15 at the coordinates (0, 3), (2, 3), (0, 0), and (2, 0) are turned on.

When $d_x=1.5\lambda$ and $d_y=\lambda/2$, the combination is of every two other antenna elements 15 on the x-axis and the antenna elements 15 neighboring on the y-axis, for instance, the antenna elements 15 at the coordinates (0, 2), (3, 2), (0, 1), and (3, 1) are turned on.

When $d_x=1.5\lambda$ and $d_y=\lambda$, the combination is of every two other antenna elements 15 on the x-axis and every other antenna elements 15 on the y-axis, for example, the antenna elements 15 at the coordinates (0, 2), (3, 2), (0, 0), and (3, 0) are turned on.

As such, when the antenna elements 15 are turned on in the rectangular form, the BER abruptly drops as a signal to noise (SNR) increases as shown in FIG. 5. As the spacing between the antenna elements 15 being turned on increases, the BER decreases. Therefore, it is advantageous to select the antenna elements 15 arranged as far apart as possible when turning on the antenna elements 15 in the rectangular form. In other words, it is more advantageous, for example, to use an antenna spacing of $d_x=1.5\lambda$ and $d_y=1.5\lambda$ over a spacing $d_x=\lambda/2$ and $d_y=\lambda/2$, or $d_x=1.5\lambda$ and $d_y=1.5\lambda$ over a spacing $d_x=\lambda$ and $d_y=\lambda$, etc.

Figure 6:
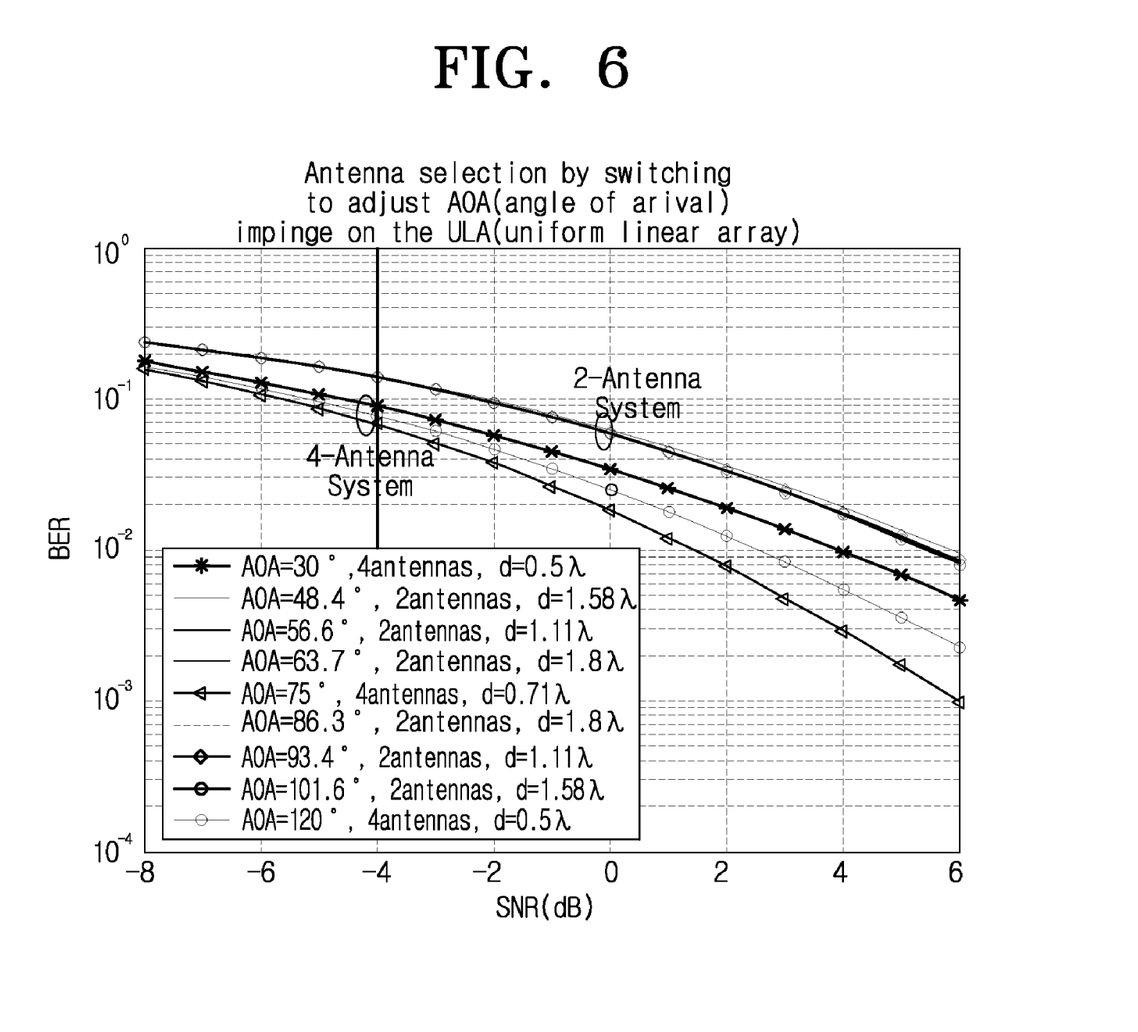
FIG. 6 is a graph of a BER when the antenna elements of the antenna array of FIG. 1 are turned on in the line form.

FIG. 6 is a graph of a BER when the antenna elements of the antenna array of FIG. 1 are turned on in the line form. An angle of arrival (AOA) denotes the incident angle and d is a distance between the antenna elements 15 forming the line. Particularly, FIG. 6 shows the BER of the antenna elements 15 which are turned on in a form of nine lines.

In FIG. 6, when the incident angle is 30, 48.4, 56.6, 63.7, 75, 86.3, 93.4, 101.6, or 120.4 degrees, the BER is measured by turning on the antenna elements 15 which are arranged on a line perpendicular to the incident angle. At the incident angles of 30, 75, and 120 degrees, four antenna elements 15 are turned on. In the other cases, two antenna elements 15 are turned on.

As shown in FIG. 6, when the two antenna elements 15 are turned on, the BER is greater than when the four antenna elements 15 are turned on (i.e., for incident angles of 30, 75, and 120 degrees). Hence, it is more advantageous to use four antenna elements 15 rather than two antenna elements 15 in order to lower the BER.

While the antenna elements are arranged in a 4×4 matrix form in the above described exemplary embodiment, a different number of antenna elements can be arranged in the matrix form. For example, 64 antenna elements could be arranged in an 8×8 matrix form, or 32 antenna elements could be arranged in an 8×4 matrix form. Also, as the number of the antenna elements increases, the beam patterns can be formed more closely to the direction of the radio signals.

In the array antenna system constructed above, the plurality of antenna elements 15 are arranged in the matrix form and selectively turned on according to the direction of the transmitted and received radio signals. Thus, there is no need to repeat the processes to match the direction of the main lobe to the direction of the transmitted and received radio signals as in the related art. As a result, the antenna system of exemplary embodiments of the present invention can form the beam patterns matching the direction of the transmitted and received radio signals far more rapidly.

Furthermore, by reducing the number of the RF circuits 30 in the antenna system compared to the related art, a simplified antenna system structure, a cost reduction, and decreased power consumption can be achieved. In spite of the simplified structure of the antenna system, the BER level can be maintained.

Moreover, as one can see from the graphs of FIGS. 3 and 4, the antenna efficiency can be enhanced by raising the directivity of the antenna system and the gain of the main lobe. Also, by lowering the sidelobe level, the system complexity can be mitigated and a probability of interference can be reduced, without additional elements and processes needed in the related art to lower the sidelobes.

As set forth above, exemplary embodiments of the present invention can more rapidly form beam patterns matching the direction of the transmitted and received radio signals. Also, the antenna system structure can be simplified, the cost can be reduced, and the power consumption can be lowered. Further, the antenna efficiency can be enhanced by raising the directivity of the antenna system and the gain of the main lobe, and a probability of interference can be reduced by lowering the sidelobe level.

The foregoing exemplary embodiments and advantages are merely exemplary and are not to be construed as limiting the present invention. The present inventive concept can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An array antenna system comprising:
    a plurality of antenna elements which are arranged at intervals in rows and in columns; and
    a control means which selects at least two antenna elements of the plurality of the antenna elements according to a direction of received radio signals and spacing between the at least two antenna elements and selectively operates the selected at least two antenna elements of the plurality of the antenna elements.

2. The array antenna system of claim 1, wherein the plurality of the antenna elements are arranged in an n×n matrix form at a regular interval.

3. The array antenna system of claim 2, wherein the regular interval is determined based on an operating frequency of the array antenna system.

4. The array antenna system of claim 2, further comprising:
    at least one radio frequency (RF) circuit which processes signals from the at least two antenna elements which selectively operate among the plurality of the antenna elements.

5. The array antenna system of claim 4, wherein the control means comprises:
    a direction determiner which determines a direction of the radio signals received on the plurality of the antenna elements according to a result processed from the at least one RF circuit.

6. The array antenna system of claim 5, wherein the direction determiner determines the direction of the radio signals depending on a strength difference of the radio signals received on the plurality of antenna elements.

7. The array antenna system of claim 5, wherein the control means comprises:
    n-ary switches which selectively couple the antenna elements to the at least one RF circuit.

8. The array antenna system of claim 7, wherein the control means further comprises:
    a switch controller which selects the at least two antenna elements from the plurality of the antenna elements depending on the direction of the radio signals, and operates the n-ary switches so as to form beam patterns according to the direction of the radio signals.

9. The array antenna system of claim 8, wherein the switch controller selects the at least two antenna elements such that the at least two antenna elements form a line.

10. The array antenna system of claim 9, wherein the line of the at least two antenna elements is perpendicular to the direction of the radio signals.

11. The array antenna system of claim 8, wherein the switch controller selects n-ary antenna elements from the plurality of the antenna elements arranged in the n×n matrix form.

12. The array antenna system of claim 8, wherein the switch controller selectively couples n-ary antenna elements arranged in a rectangular form among the plurality of the antenna elements, to the n-ary switches.

13. The array antenna system of claim 12, wherein the n-ary antenna elements arranged in the rectangular form are disposed as far apart as possible from one another.

14. The array antenna system of claim 8, wherein the switch controller selects a number of the n-ary antenna elements according to how close the beam patterns are to the direction of the radio signals.

* * * * *